United States Patent [19]
Kennedy

[11] Patent Number: 5,487,551
[45] Date of Patent: Jan. 30, 1996

[54] FLEXIBLE BAG MOUNTING AND CARRYING DEVICE

[76] Inventor: Samuel Kennedy, 540 Timothy Street, Apt. 302, New Market, Ontario, Canada, L3Y 5N5

[21] Appl. No.: 336,398

[22] Filed: Nov. 9, 1994

[51] Int. Cl.⁶ .............................. B65B 67/12; B62B 1/22
[52] U.S. Cl. .................... 280/47.19; 248/98; 248/100; 280/47.26; 280/79.11
[58] Field of Search .................... 248/95, 97, 98, 248/99, 100, 101; 280/47.131, 47.17, 47.19, 47.24, 47.26, 79.11

[56] References Cited

U.S. PATENT DOCUMENTS

| | | | |
|---|---|---|---|
| 2,420,243 | 5/1947 | Helms | 248/101 |
| 3,603,542 | 9/1971 | Grille | 248/101 X |
| 4,783,090 | 11/1988 | Moulton | 248/101 X |
| 4,917,393 | 4/1990 | Rogers | 248/99 X |
| 5,228,654 | 7/1993 | Carpentier | 248/99 |
| 5,263,672 | 11/1993 | He | 248/97 |

Primary Examiner—Karin L. Tyson
Assistant Examiner—Michael Mar
Attorney, Agent, or Firm—David W. Wong

[57] ABSTRACT

The portable collection bag carrier has two tubular support posts removably mounted on a base board. A T-shaped bracket is mounted on each post. A vertical slot is formed at each end of the horizontal bar member of the T-shaped bracket. A slider member is slidably mounted on the vertical leg member of the T-shaped bracket, and a loop-shaped cable is mounted on the slider member. A collection bag may be removably mounted on the carrier by folding the top rim of the bag to wrap over the horizontal bar member of the T-shaped brackets, and placing the loop-shaped cable over the folded top rim of the bag to engage with the vertical slots. The cable is then tightened by sliding the slider member downwards to secure the bag in place. The base is also provided with a set of wheels and a tow rope to facilitate the carrier from being moved with ease around the work area for filling the bag.

9 Claims, 1 Drawing Sheet

5,487,551

FLEXIBLE BAG MOUNTING AND CARRYING DEVICE

BACKGROUND OF THE INVENTION

This invention relates to a collection bag carrier which is operative to maintain a flexible bag such as a refuse bag in an opened condition to facilitate filling the same.

In using a flexible bag, it is often difficult and frustrating for a user in trying to maintain the top of the bag in the opened condition while filling it. This is particularly troublesome in using a plastic bag such as a plastic refuse bag in a yard in which wind can cause the bag to collapse in a close condition rendering the filling operation arduous. Furthermore, the filling difficulty is complicated by the necessity of carrying the bag around the yard or work area to collect the refuse.

Heretofore, numerous support frames have been developed for maintaining the collection bag in an opened condition while it is being filled. However, such support frames are complex and bulky in construction and they are difficult to use or to store while they are not being used. Moreover, they are not convenient to be carried by the user moving around the working area.

Some support frames are provided with complex or numerous securing means of the bag such that it is burdensome in mounting the bag onto the frame or dismounting it therefrom.

SUMMARY OF THE INVENTION

It is the principal object of the present invention to provide a carrier which is operative to maintain a flexible bag in an opening condition for filling operation.

It is another object of the present invention to provide a carrier which is simple in structure and it may be disassembled for storage or be assembled quickly for use.

It is another object of the present invention to provide a carrier which is adjustable to accommodate bags of various length.

It is yet another object of the present invention to provide a portable carrier which facilitates the user to move the bag conveniently around the work area for the filling operation.

It is still yet another object of the present invention to provide a carrier to which the mounting and dismounting of the bag may be carried out simply and expeditiously.

BRIEF DESCRIPTION OF THE DRAWINGS

Other objects of this invention will appear in the following description and appended claims reference being made to the accompanying drawings in which.

DETAILED DESCRIPTION OF THE PREFERRED EMBODIMENTS

Figure 1:
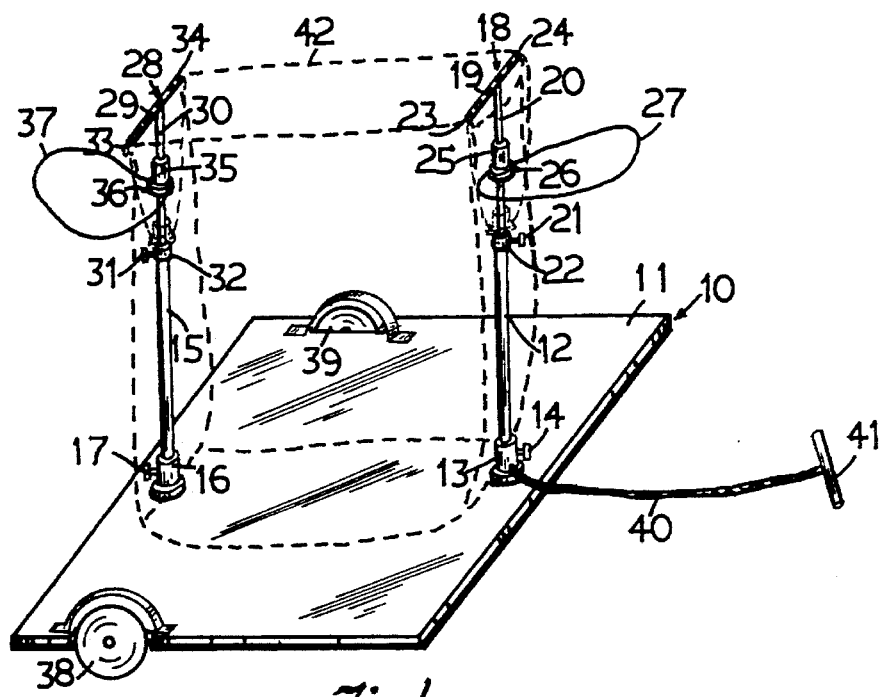
FIG. 1 is an overall perspective elevation view of the carrier with the refuse bag shown in dotted line mounted thereon according to the present invention.
Figure 2:
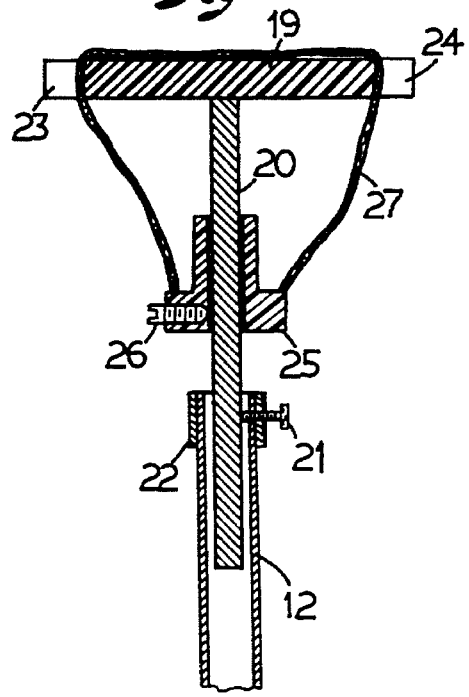
FIG. 2 is an isolated enlarged cross sectional elevation view of the T-shaped bracket and the slider member mounted on the front tubular post of the carrier according to the present invention.
Figure 3:
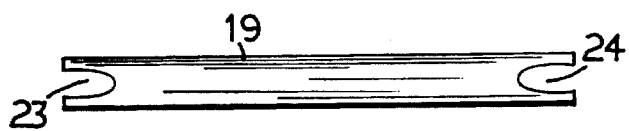
FIG. 3 is a top elevation view of the horizontal bar member of the T-shaped bracket showing the slots formed at the two end therein.
Figure 4:
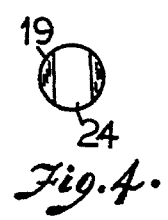
FIG. 4 is an end elevation view of the horizontal bar member showing the slot formed therein.

With reference to the drawings wherein like reference numerals designate corresponding parts in the several views, the carrier 10 according to the present invention has a base board 11 which is preferably generally square in shape. A first tubular post 12 is located preferably at the middle of the front edge portion of the base board 11 in a vertical manner. The tubular post 12 is removably mounted to a sleeve mounting 13 secured to the base board 11. The tubular post 12 is secured to the sleeve mounting 13 by a manually adjustable securing bolt 14 such that the tubular post 12 may be easily mounted to or dismounted from the sleeve mounting with ease. Similarly, a second tubular post 15 extending in a vertical manner is removably mounted to a sleeve mounting 16 located at the middle portion of the rear edge of the base board 11 and is located directly opposite to the first tubular post 12. The second tubular post 15 is also secured to the sleeve mounting 16 by a manually adjustable securing bolt 17 for the same purposes.

A first T-shaped mounting bracket 18 having a generally horizontal bar member 19 and an elongated vertical leg member 20 and it is mounted at the top of the first tubular post 12 with its vertical leg member 20 slidably inserted into the top of the first tubular post 12. The first T-shaped mounting bracket 18 may be fixed in place at a selected height by an adjustable set screw bolt 21 provided at the side of the top portion of the first tubular post 12, and a reinforcing sleeve 22 may be provided at the top end portion of the first tubular post 12. Vertical slots 23 and 24 are respectively formed at the two ends of the horizontal bar member 19 of the T-shaped mounting bracket 18.

A slider member 25 is slidably mounted on the vertical leg member 20 of the T-shaped mounting bracket 18. The mounting pressure of the slider member 25 to the leg member 20 may be adjusted by a set screw 26 provided at the side of the slider member 25 such that the slider member 25 will be maintained by the tightening pressure of the set screw 26 against the vertical leg member 20 to remain securely at a selected position. The slider member 25 may only be pushed with such force to another selected position without having to operate the set screw 26. Alternatively, a manually adjustable set screw bolt may be provided such that the bolt may be operated to enable the slider member 25 to be moved and secured at any selected position. A loop-shaped cable 27 is mounted to the slider member 18. The cable 27 has such a length that it may be looped over the horizontal bar member 19 of the T-shaped bracket 18 and to engage with the slots 23 and 24 of the latter. The engagement may be facilitated by sliding the slider member 25 upwards towards the horizontal bar member 19 such that the cable 27 is loosely engaging with the horizontal bar member 19. The engagement may then be tightened by sliding the slider member 25 downwards until the cable 27 is taut.

Similarly, a second T-shaped mounting bracket 28 is slidably mounted at the top of the tubular post 15. The T-shaped mounting bracket 28 has a horizontal bar member 29 and an elongated vertical leg member 30. The T-shaped mounting bracket 28 is secured to the tubular post 15 by a manually operative set screw bolt 31. The top end portion of the tubular post 15 is reinforced with a sleeve 32. The T-shaped mounting bracket 28 may be secured at any selected height by the set screw bolt 31. Vertical slots 33 and 34 are respectively formed at the two ends of the horizontal bar member 29 of the T-shaped mounting bracket 28. A slider member 35 is slidably mounted on the vertical leg member 30 of the T-shaped mounting bracket 28. The mounting pressure of the slider member 35 may be adjusted by the set screw 36 provided at the side of the slider member 35. A loop-shaped cable 37 is mounted to the slider member 35. The engagement of the loop-shaped cable 37 with the horizontal bar member 29 may be adjusted by sliding the slider member 35 similar to that of the engagement of the slider member 26 and horizontal bar member 19 as described above.

Two wheels 38 and 39 may be provided at the two sides of the base board 11 adjacent to the rear edge therein, and a tow rope 40 is mounted to the front edge of the base board 11 such that the carrier may be towed and be moved around a work area with ease. The tow rope 40 may be mounted to the sleeve mounting 13 or to the base board 11 directly. A hand grip 41 may be provided at the free end of the tow rope 40 to facilitate pulling the carrier 10 may be pulled by hand around the work area.

In use, the flexible bag 42 may be quickly mounted to the carrier 10 by folding a portion of opposite sides of its top rim over the horizontal bar members 19 and 29 of the T-shaped mounting brackets 18 and 28. The position of the T-shaped mounting brackets 18 and 28 may be adjusted by varying the length of the vertical leg members 20 and 30 inserting into the tubular posts 12 and 15 respectively so as to accommodate bags of different lengths. The slider members 25 and 35 are pushed upwards towards the horizontal bar members 19 and 29 such that the loop-shaped cables 27 and 37 may be easily looped over the folded top rim portion of the flexible bag 42 now wrapping over the horizontal bar member 19 and 29 and their end slots 23, 24 and 33, 34 of the T-shaped mounting brackets 19 and 29 respectively. After the engagement, the slider members 25 and 35 may then be pushed downwards away from the horizontal bar members 19 and 29 respectively until the cables 27 and 37 are tightly securing the portions of the top rim of the flexible bag 42 wrapping over the T-shaped mounting brackets 19 and 29 so as to secure the bag to the carrier as well as to maintain the top of the bag in the opened position for the filling operation. The carrier 10 with the bag 42 mounted thereon may be conveniently pull around the work area by hand with the tow rope 40. The filled bag may be quickly removed from the carrier 10 by pushing the slider members 25 and 35 upwards to loosen the engagement of the cables 27 and 37 with the T-shaped mounting brackets 18 and 28 respectively such that the cables 27 and 37 may be disengaged therefrom and the bag may then be removed from the carrier 10.

Although I have described certain features of the present invention in more or less detail, it will be apparent that various changes, additions, omissions and substitutions can be made therein without departing from the spirit of the invention or the scope of the appended claims.

What is claimed is:

1. A flexible bag mounting and carrying device comprising, a base board member, two tubular post members mounted in an upright position on said base board member, said tubular post members being located directly opposite to each other, a first T-shaped mounting bracket member mounted at the top of one tubular post member, said first T-shaped mounting bracket member having a horizontal bar member and an elongated vertical leg member, said vertical leg member being slidably engaged with the top portion of said one tubular post member, said horizontal bar member having a vertical slot formed at each end therein, a second T-shaped mounting bracket member mounted at the top of the other tubular post member, said second T-shaped mounting bracket member having a horizontal bar member and an elongated vertical leg member, said vertical leg member of said second T-shaped mounting bracket member being slidably engaged with the top portion of said other tubular post member, said horizontal bar member of said second T-shaped mounting bracket member having a vertical slot formed at each end therein, a first slider member slidably mounted on said elongated vertical leg member of said first T-shaped mounting bracket member, said first slider member being normally maintained in a selected position on said vertical leg member of said first T-shaped mounting bracket member by a set screw means provided on said first slider member, a second slider member slidably mounted on said elongated vertical leg member of said second T-shaped mounting bracket member, said second slider member being normally maintained in a selected position on said vertical leg member of said second T-shaped mounting bracket member by a set screw means provided on said second slider member, a first loop-shaped cable means mounted on said first slider member, said first loop-shaped cable means being operative to engage in a looping manner with said horizontal bar member of said first T-shaped mounting bracket member and said slots formed therein, a second loop-shaped cable means mounted on said second slider member, said second loop-shaped cable means being operative to engage in a looping manner with said horizontal bar member of said second T-shaped mounting bracket member and said slots formed therein.

2. A flexible bag mounting and carrying device according to claim 1 including a first set screw means provided at the top end portion of said first tubular post member, said first set screw means being operative for engaging with said elongated leg member of said first T-shaped mounting bracket member for securing said T-shaped mounting bracket member to said first tubular post member, a second set screw means provided at the top end portion of said second tubular post member, said second set screw means being operative for engaging with said elongated leg member of said second T-shaped mounting bracket member for securing said second T-shaped mounting bracket member to said second tubular post member.

3. A flexible bag mounting and carrying device according to claim 2 including a third set screw means provided on said first slider member, said third set screw means being operative for providing a tightening pressure against said vertical leg member of said first T-shaped mounting bracket for normally maintaining said first slider member at a selected position on said vertical leg member of said first T-shaped mounting bracket member, and a fourth set screw means provided on said second slider member, said fourth set screw means being operative for providing a tightening pressure against said vertical leg member of said second T-shaped mounting bracket member for normally maintaining said second slider member at a selected position on said vertical leg member of said second T-shaped mounting bracket member.

4. A flexible bag mounting and carrying device according to claim 3 including two wheels provided at two sides of said base board member, and a tow rope means provided at the front of said base board member.

5. A flexible bag mounting and carrying device according to claim 4 wherein said wheels are located adjacent to the rear of said base board member.

6. A flexible bag mounting and carrying device according to claim 5 including a reinforcing sleeve member provided at the top end portion of said first tubular post member and said second tubular post member.

7. A flexible bag mounting and carrying device comprising,

- a generally square base board member disposed in a horizontal manner,
- a first mounting sleeve member secured to the top surface of said base board member and being located at the middle of the front edge portion of said base board member,
- a first tubular post member extending vertically upwardly from said base board member, said first tubular post member having a bottom end engaged with said first mounting sleeve member and being secured thereto by a first set screw means provided on said first mounting sleeve member,
- a second mounting sleeve member secured to the top surface of said base board member being located at the middle of the rear edge portion of said base board member directly opposite to said first mounting sleeve member,
- a second tubular post member extending vertically upwardly from said base board member, said second tubular post member having a bottom end engaged with said second mounting sleeve member and being secured thereto by a second set screw means provided on said second mounting sleeve member,
- a first T-shaped mounting bracket member slidably mounted to the top end of said first tubular post member, said first T-shaped mounting bracket member having a horizontal bar member and an elongated vertical leg member, said elongated vertical leg member being inserted into the top of said first tubular post member and being secured in place by a third set screw means provided at the top end portion of said first tubular post member,
- a second T-shaped mounting bracket member slidably mounted to the top end of said second tubular post member, said second T-shaped mounting bracket member having a horizontal bar member and an elongated vertical leg member, said elongated vertical leg member of said second T-shaped mounting bracket member being inserted into the top of said second tubular post member and being secured in place by a fourth set screw means provided at the top end portion of said second tubular post member,
- said horizontal bar member of said first T-shaped mounting bracket member having a vertical slot formed at each end therein,
- said horizontal bar member of said second T-shaped mounting bracket member having a vertical slot formed at each end therein,
- a first slider member slidably mounted on said vertical leg member of said first T-shaped mounting bracket member,
- a fifth set screw means provided at said first slider member, said fifth set screw means being operative to secure said first slider member at a selected position on said vertical leg member of said first T-shaped mounting bracket member,
- a first loop-shaped cable member mounted to said first slider member, said first loop-shaped cable member being operative to engage with said horizontal bar member of said first T-shaped mounting bracket member and said slots formed therein,
- a second slider member slidably mounted on said vertical leg member of said first T-shaped mounting bracket member,
- a sixth set screw means provided at said second slider member, said sixth set screw means being operative to secure said second slider member at a selected position on said vertical leg member of said second T-shaped mounting bracket member,
- a second loop-shaped cable member mounted to said second slider member, said second loop-shaped cable member being operative to engage with said horizontal bar member of said second T-shaped mounting bracket member and the slots formed therein.

8. A flexible bag mounting and carrying device according to claim 7 including two wheels provided at two sides of said base board member, said wheels being located close to the rear edge of said base board member, and an elongated tow rope means having one end secured to said base board member.

9. A flexible bag mounting and carrying device according to claim 8 including a hand grip bar mounted to the free end of said tow rope means.

* * * * *